US011909155B2

(12) United States Patent
Koellmann et al.

(10) Patent No.: US 11,909,155 B2
(45) Date of Patent: Feb. 20, 2024

(54) CONDUCTOR CONNECTION TERMINAL

(71) Applicant: WAGO Verwaltungsgesellschaft mbH, Minden (DE)

(72) Inventors: Hans-Josef Koellmann, Minden (DE); Michael Meyer, Wiedensahl (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 353 days.

(21) Appl. No.: 17/486,406

(22) Filed: Sep. 27, 2021

(65) Prior Publication Data

US 2022/0013929 A1 Jan. 13, 2022

Related U.S. Application Data

(63) Continuation of application No. PCT/EP2020/058252, filed on Mar. 25, 2020.

(30) Foreign Application Priority Data

Mar. 29, 2019 (DE) ..................... 10 2019 108 291.9

(51) Int. Cl.
*H01R 4/48* (2006.01)
*H01R 13/50* (2006.01)

(52) U.S. Cl.
CPC ......... *H01R 4/48185* (2023.08); *H01R 13/50* (2013.01)

(58) Field of Classification Search
CPC ................ H01R 4/48185; H01R 13/50; H01R 4/48365; H01R 9/2491
See application file for complete search history.

(56) References Cited

U.S. PATENT DOCUMENTS 8,444,443 B2 * 5/2013 Schafmeister ..... H01R 4/48365 439/441
8,632,355 B2 1/2014 Hartmann
8,858,269 B2 10/2014 Brand et al.
(Continued)

FOREIGN PATENT DOCUMENTS

CN 102640356 A 8/2012
CN 102683908 A 9/2012
(Continued)

OTHER PUBLICATIONS

International Preliminary Report on Patentability dated Sep. 28, 2021 in corresponding application PCT/EP2020/058252.
(Continued)

*Primary Examiner* — Abdullah A Riyami
*Assistant Examiner* — Nelson R. Burgos-Guntin
(74) *Attorney, Agent, or Firm* — Muncy, Geissler, Olds & Lowe, P.C.

(57) ABSTRACT

A conductor terminal that has an insulating housing, which has a conductor insertion opening for inserting an electrical conductor and a contact element insertion opening for inserting a contact element. A busbar has a clamping section arranged between the inserted electrical conductor and the inserted contact element. A first clamping spring is provided for clamping the electrical conductor, which includes a first clamping leg having a clamping edge oriented in the direction of the clamping section, a first spring bend and a first contact leg, the clamping edge and the clamping section forming a first clamping point for clamping the electrical conductor.

15 Claims, 5 Drawing Sheets

(56) References Cited

U.S. PATENT DOCUMENTS

| | | | | |
|---|---|---|---|---|
| 8,932,075 | B2 * | 1/2015 | Reibke | H01R 4/48185 439/708 |
| 9,184,540 | B2 * | 11/2015 | Wilinski | H01R 13/629 |
| 9,225,081 | B2 | 12/2015 | Schrader | |
| 9,502,790 | B2 | 11/2016 | Kollmann et al. | |
| 10,014,596 | B2 | 7/2018 | Hartmann | |
| 10,833,435 | B2 | 11/2020 | Villard et al. | |
| 2011/0217882 | A1 | 9/2011 | Gassauer | |
| 2011/0223795 | A1 * | 9/2011 | Schafmeister | H01R 4/48365 439/370 |
| 2013/0330985 | A1 * | 12/2013 | Wilinski | H01R 13/629 29/874 |
| 2018/0248276 | A1 * | 8/2018 | Kettern | H01R 4/40 |

FOREIGN PATENT DOCUMENTS

| | | | |
|---|---|---|---|
| DE | 202008010347 | U1 | 10/2008 |
| DE | 102008049236 | B3 | 6/2010 |
| DE | 102011051536 | A1 | 1/2013 |
| DE | 102011052202 | A1 | 1/2013 |
| DE | 202013100635 | U1 | 3/2013 |
| DE | 102015107853 | A1 | 11/2016 |
| DE | 102016108825 | A1 | 11/2017 |
| DE | 202017105467 | U1 | 12/2018 |
| WO | WO2018059694 | A1 | 4/2018 |

OTHER PUBLICATIONS

International Search Report dated Jun. 5, 2020 in corresponding application PCT/EP2020/058252.

* cited by examiner

CONDUCTOR CONNECTION TERMINAL

This nonprovisional application is a continuation of International Application No. PCT/EP2020/058252, which was filed on Mar. 25, 2020, and which claims priority to German Patent Application No. 10 2019 108 291.9, which was filed in Germany on Mar. 29, 2019, and which are both herein incorporated by reference.

BACKGROUND OF THE INVENTION

Field of the Invention

The present invention relates to a conductor terminal, which includes a housing, which has a conductor insertion opening for inserting an electrical conductor and a contact element insertion opening for inserting a contact element; a busbar, which has a clamping section arranged between the inserted electrical conductor and the inserted contact element; and a first clamping spring for clamping the electrical conductor, which includes a first clamping leg having a clamping edge oriented in the direction of the clamping section, a first spring bend and a first contact leg, the clamping edge and the clamping section forming a first clamping point for clamping the electrical conductor.

Description of the Background Art

Conductor terminals of this type are used to clamp at least one electrical conductor on a contact insert by clamping with the aid of the clamping spring. A conductor terminal of this type is known, for example, from DE 10 2015 107 853 A1, which corresponds to US 2018/0076536, which is incorporated herein by reference.

SUMMARY OF THE INVENTION

It is therefore an object of the present invention to provide an improved conductor terminal.

This object is achieved for a conductor terminal of the type mentioned at the outset in that the conductor terminal includes a second clamping spring, which is designed as a separate component from the first clamping spring and in that the second clamping spring including at least one second clamping leg for clamping the contact element, the second clamping leg being oriented in the direction of a contact section of the busbar, so that a second clamping point for the contact element to be clamped is formed between the contact section and the second clamping leg.

In this way, a compact conductor terminal may be provided, which permits an electrical contacting of an electrical conductor as well as an electrical contacting of a contact element. The electrical conductor may be an electrical conductor of any type, for example a stripped end of an electrical conductor having an insulating envelope, for example a stranded conductor or a singe-wire conductor. The contact element may be an arbitrary electrical contact element, for example an arbitrary electrical conductor or a conductive element, which has a rigid or predominantly rigid form. This may include contact pins, rigid conductors or any type of a predominantly rigid and electrically conductive elements. The contact element may be, for example, a contact pin or contact blade, for example a contact pin or contact blade of an electrical plug connection.

Due to the invention, a conductor terminal, in particular, may be provided, which may be mounted on a contact element of an electrical device, for example in the form of a snap-on terminal and/or a luminaire terminal. The housing of the conductor terminal may be designed as an insulating housing. The conductor terminal may thus be designed as a snap-on terminal. The portion of the conductor terminal which includes the second clamping spring having the second clamping point is used for mounting.

Due to the fact that the first and second clamping springs are designed as separate components, particular clamping elements may be provided, which are designed in keeping with the corresponding electrical contacting requirements and mechanical fixing requirements of the electrical conductor, on the one hand, and of the contact element, on the other hand. The first and second clamping springs may differ, for example, with respect to the type of material, the material cross-section and/or the clamping force. The first clamping leg of the first clamping spring has a clamping edge for fixedly clamping the electrical conductor at one end in each case. The second clamping leg of the second clamping spring may be designed according to the requirements, for example with a rounded area on the end without a clamping edge, or with a clamping edge on the end of the second clamping leg.

The busbar can have a first bent section adjoining the first clamping section, in which the busbar transitions in an bow-shaped manner directly into the contact section or via at least one further section of the busbar. The clamping section is therefore spaced a distance apart from the contact section by the first bent section adjoining the clamping section. The clamping section and the contact section are thus also not arranged on opposite sides of the same busbar area as in the case of, for example, the prior art, but instead, as mentioned, are spaced a slightly greater distance apart and are thereby separated from each other.

The busbar may have, for example, a first bent section, by means of which the clamping section is directly connected to the contact section. The first bent section may span an angle of 80 degrees to 210 degrees. For example, the first bent section may span an angle of approximately 90 degrees or approximately 180 degrees. A second bent section of the busbar may also adjoin the first bent section, so that the busbar is provided with a multiple arch-shaped design. The second bent section may be bent in the same direction as the first bent section or in the opposite bending direction. For example, the busbar may be provided with a stepped design when viewed from the side as a result of the at least double-arch-shaped design.

The contact section can be arranged essentially and/or predominantly in parallel to the clamping section. For this purpose, the contact section may be oriented with respect to the clamping section, for example, in such a way that the center line of the contact section does not intersect the center line of the clamping section in the area of the conductor terminal, e.g., in the area surrounded by the housing of the conductor terminal. This permits a favorable, compact design of the conductor terminal. In particular, a conductor insertion direction, which is used to insert the electrical conductor, may be essentially in parallel to a contact element insertion direction, which is used to insert the contact element.

If the contact section is arranged essentially in parallel to the clamping section, either an exact parallelism or a slight angle deviation may exist, for example a maximum of 15 degrees between the contact section and the clamping section. In this way, the contact section is designed to be at least approximately in parallel to the clamping section. The contact section does not have to be arranged so as to overlap with the clamping section over its entire length and also not over a portion of its length. Instead, the contact section and clamping section may also be arranged offset with respect to each other and nevertheless be arranged essentially in parallel to each other, i.e., corresponding planes defined by the contact section and the clamping section are then essentially in parallel to each other.

If the contact section is arranged predominantly in parallel to the clamping section, this means that the contact section and the clamping section are arranged so as to at least partially overlap (perpendicularly to the plane of the contact section in one viewing direction), the overlapping area comprising at least 50% of the length of the contact section.

The first clamping spring can be suspended by its first contact leg on an elongated holding section of the second clamping spring or on an elongated holding section of the busbar. In this way, no additional components are necessary for fixing the first clamping spring. In the first variant, the second clamping spring has an elongated holding section. In this case, a through-opening limited with a transverse web may be present on this holding section of the second clamping spring, into which the first contact leg is suspended by its free end. In the second variant, the busbar has an elongated holding section. In this case, the holding section of the busbar may have a through-opening limited with a transverse web, into which the first contact leg is suspended by its free end.

The elongated holding section can run orthogonally and/or predominantly orthogonally to the clamping section. An angle of at least approximately 90 degrees is thus formed between the holding section and the clamping section, e.g., an angle in the range from 75 degrees to 105 degrees. This has the advantage that a compact first clamping spring may be used, so that on the whole a compact conductor terminal may be provided. For example, it may be provided that the holding section protrudes toward the first contact leg orthogonally to the contact section of the busbar in the direction of the clamping section.

The second clamping spring and the busbar can be coupled with each other in a form-fitting manner. The busbar and the second clamping spring are fixed to each other in a form-fitting manner thereby. In this way, the parts which form the contact insert of the conductor terminal, namely the first and second clamping springs as well as the busbar, are assembled into a structural unit.

The second clamping spring can include a second contact leg, the second contact leg and the busbar being coupled with each other in a form-fitting manner. This permits a reliable attachment to the busbar, in particular in the case of a second clamping spring without an elongated holding section.

The conductor terminal can have a conductor insertion chamfer arranged in front of the clamping section of the busbar in the conductor insertion direction of the electrical conductor in the conductor insertion opening toward the first clamping point. In this way, an electrical conductor is reliably guided to the first clamping point. The conductor insertion chamfer may be formed, for example, in the material of the housing.

The clamping section of the busbar may have, for example, a rib or a contact projection on the contact side facing the electrical conductor and/or the contact element. In this way, the electrical contacting of the electrical conductor may be further improved.

The conductor terminal may include a manual actuating element for opening and closing the first clamping point. The manual actuating element acts mechanically upon the first clamping spring. In an opened position, the clamping leg of the first clamping spring is deflected by the manual actuating element in such a way that the clamping leg is moved away from the clamping section, so that a distance is present between the clamping leg and the clamping section, even if the electrical conductor is not inserted. In a closed position, the clamping section abuts the electrical conductor with its clamping edge or, if no electrical conductor is clamped, it abuts the clamping section. The conductor terminal may be designed, in particular, without a manual actuating element for actuating the second clamping spring. The second clamping spring may thus be actuating into an opened position or another position by a manual actuating element of the conductor terminal.

It is advantageous if the actuating element is movably built into the housing and coupled with the first clamping spring for opening the first clamping point.

The actuating element can have an actuator, which is arranged at the side of the first clamping spring, an actuating contour of the actuator being operatively connected to the first clamping leg. This permits a reliable actuation of the first clamping spring.

Further, it is possible that the actuator is operatively connected to the first contact leg and/or to the clamping section. For example, an outer semicircular lateral surface of the actuator may be supported against an area of the first contact leg, on the one hand, and against an area of the clamping section, on the other hand, whereby an operative connection is established between the first contact leg and the clamping section. On the whole, the actuator may be supported or clamped between the first contact leg, an elongated holding section of the second clamping spring, to which the first contact leg is fastened, and an actuating section of the first clamping spring, which is situated on the first clamping leg. In this way, a permanent positioning of the actuator within the contact insert of the conductor terminal is ensured.

The actuating contour can have a circumferentially circular or semicircular pin with a V-shaped cutout, the first clamping leg protruding into the V-shaped cutout with an actuating section. In this way, an actuating element may be provided, by means of which an opening and closing of the first clamping point may be achieved by lifting or lowering the first clamping leg.

The first clamping leg can have at least one side cutaway section, into which the actuator protrudes. In the area of this cutaway section, the width of the first clamping leg is thus reduced with respect to its area adjacent to the spring bend. In this way, an sufficient clearance is provided for the pivoting movement of the semicircular pin of the actuator. In addition, stresses acting upon the housing may be minimized hereby.

The actuating element can be an actuating lever, which may be pivoted via a pivot bearing. The actuating lever may be supported in a floating manner, so that the pivot bearing does not have a fixed rotation axis. Alternatively, the actuating lever may also be supported with a fixed rotation axis, for example, in that at least one bearing journal is arranged on the actuating lever. In this way, the actuating element may be designed as an actuating lever, which is pivotably supported in the housing and protrudes out of the housing.

The first clamping point can be arranged in the area of the pivot bearing of the actuating lever. This is also conducive to a compact design of the conductor terminal. The electrical conductor may be guided, for example, between two side plates of the actuating level through to the first clamping point. An electrical conductor clamped at the first clamping point is then arranged in the area surrounded by the side plates.

The housing can have a height, a width and a length as outer dimensions. The length of the housing is measured in conductor insertion direction L, the height is the largest outer dimension of the housing perpendicular to the conductor insertion direction. The electrical contact insert present in the housing, including the first clamping spring and the second clamping spring as well as the busbar, is arranged in a type of dual-level arrangement in the direction of the height dimension of the housing, i.e., the first and the second clamping springs are arranged one above the other or one below the other in the direction of the height dimension. According to one advantageous embodiment of the invention, the housing is provided with a relatively compact design with respect to the height, in particular it does not have the double installation height of two individual conductor terminals. The housing may have a ratio of height to length<1 or <0.9 or <0.8.

A contact element insertion channel can adjoin the contact element insertion opening, which is at least partially formed by housing walls of the housing, the contact section and/or a portion of the second clamping spring being entirely or partially arranged behind a recessed area of the housing covered by the particular housing wall in the longitudinal direction of the contact element insertion channel, viewed from the contact element insertion opening. In this way, the insertion of the contact element may be optimized, since the clamping section and/or portions of the second clamping spring do not hinder the insertion of the contact element.

The first clamping leg and the second clamping leg can be arranged on opposite sides of the busbar. The first clamping leg can point in the direction of the busbar from one side, and the second clamping leg can point in the direction of the busbar from another side, whereby the first clamping leg and the second clamping leg extend toward each other.

The housing can include at least one main housing part and a cover part, the busbar extending through an opening, at which the main housing part and the cover part do not abut each other. In this case, busbar may extend through the aforementioned opening from a space which is closed by the cover part, and out into a portion of the housing which is not closed by the cover part.

For example, an electrical conductor having a 4 $mm^2$ cross-section may be clamped at the first clamping point on the conductor terminal. For example, two contact sections, each having a 2.5 $mm^2$ cross-section, may be clamped at the second clamping point. A multiple connection is therefore also possible. The conductor terminal may, of course, be designed for different cross-sections to be connected of the electric conductor and/or the contact element.

The first and second clamping points may be arranged in different height planes in a height direction of the conductor terminal. i.e., one above the other. The height direction is a direction which extends orthogonally to the conductor insertion direction. An electrical conductor clamped at the first clamping point then overlaps in the height direction with a contact element clamped at the second clamping point.

The conductor insertion opening and the contact element insertion opening may be advantageously arranged on sides of the housing facing away from each other.

With the aid of a cover part, which has a plug-in housing section and a plug contact arranged therein, the conductor terminal may be expanded into an electrical plug connector, in which the electrical conductor may be connected with the aid of spring force clamping technology.

Due to particular designed free ends of the second clamping leg, the snap-on connection may be designed, for example, as a plug contact, e.g., as a female jack connector. A casing of a plug contact may dip, for example, into the housing of the conductor terminal during the insertion into the second clamping point.

The cover part may have a variable design and/or be replaceable. In this way, the connection used as a plug connection may be variably held with the second clamping point, e.g., with respect to the ratio of diameter of the casing to the contact element cross-section. The cover part may be designed as a pin strip, it being possible to use the locking engagement. A pin strip may also be fastenable to the cover part. The cover part may have guide slots, by means of which flat contacts may be guided. The cover part may have, for example, a molded-on plug-in housing section.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
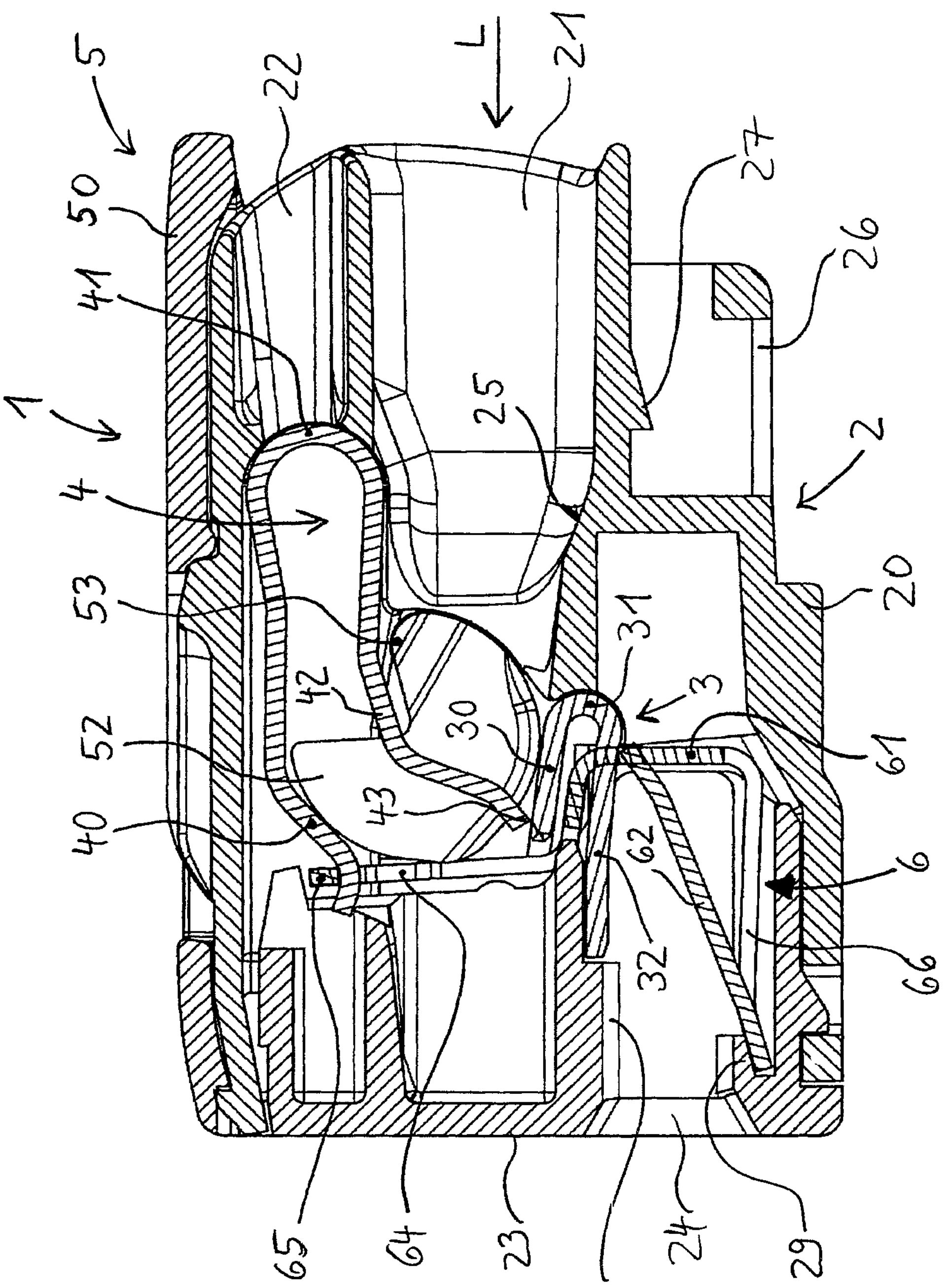
FIG. 1 shows a side sectional representation of a conductor terminal.

According to FIG. 1, conductor terminal 1 includes a housing 2. A contact insert is arranged in housing 2, which includes a busbar 3, a first clamping spring 4 and a second clamping spring 6. Conductor terminal 1 also includes an actuating element 5 designed as an actuating lever. Actuating element 5 has a manual gripping area 50, at which actuating element 5 may be manually actuated by the user.

The type of actuation is described by way of example with the actuating lever. Another type of actuation is conceivable, such as using a pushing element for actuating the clamping leg.

Housing 2 is provided with a multi-part design, for example having two parts 20, 23, which are connected to each other, e.g., via locking connections. Part 20 may be a main housing part of housing 2, which makes up the predominant part of the housing. Part 23 may be a cover part of housing 2, which is designed to close an opening of main housing part 20. The contact insert arranged in housing 2 may be fixed in housing 2 by cover part 23 in interaction with main housing part 20. For example, cover part 23 may fix busbar 3 in housing 2.

Housing 2 has a conductor insertion opening 21 for inserting an electrical conductor and a contact element insertion opening 24 for inserting a contact element. In addition, housing 2 has a test pin opening 22, through which a test pin may be inserted and be electrically contacted with the contact insert, for example, with first clamping spring 4. Housing 2 includes a conductor insertion chamfer 25. by means of which an electrical conductor may be guided to the first clamping point in a targeted manner. It is also possible to fix two conductors or contact elements next to each other or one above the other at the second clamping point with the aid of the second clamping spring. For this purpose, contact element insertion opening 24 is to be dimensioned with a corresponding size.

FIG. 1 further shows a fixing area 26 on housing 2, which may be used to fasten a function element to housing 2 or fasten housing 2 to a function element of this type, e.g., to a holder for conductor terminal 1. The fastening may also take place by locking, e.g., by a locking element 27 present in fixing area 26.

Busbar 3 has a clamping section 30, a first bent section 31 and a contact section 32. Contact section 32 is connected to clamping section 30 via first bent section 31. Clamping section 30 is used to clamp an electrical conductor; contact section 32 is used to clamp the contact element.

First clamping spring 4 includes a first contact leg 40, a spring bend 41 adjoining first contact leg 40 and a first clamping leg 42 adjoining first spring bend 41. First clamping leg 42 ends at the free end with a clamping edge 43. Clamping edge 43 and clamping section 30 form a first clamping point, which is used for clamping the electrical conductor. Second clamping spring 6 includes a second clamping leg 62. A second clamping point is formed between second clamping leg 62 and contact section 32, which is used for clamping the contact element. Second clamping spring 6 extends from second clamping leg 62 via a connecting section 61 toward an elongated holding section 64. A through-opening limited by a transverse web 65 is present in elongated holding section 64. First contact leg 40 is suspended by its free end in this through-opening. First clamping spring 4 may also be suspended by an elongated contour of busbar 3.

Second clamping spring 6 crosses at least parts of busbar 3 with its elongated holding section 64. For this purpose, corresponding recesses are present on busbar 3 and/or on second clamping spring 6, so that the desired crossing capability is established. Second clamping spring 6 may also be coupled with busbar 3 in a form-fitting manner with the aid of the recesses.

Actuating element 5 includes an actuator 52 in its area arranged in the interior of housing 2, with the aid of which first clamping leg 42 may be deflected. Actuator 52 has an actuating contour 53, which includes a circumferentially circular or semicircular pin having a V-shaped cutout. Clamping leg 42 may be actuated and therefore deflected with the aid of this actuating contour 53. First clamping point may be either opened or closed hereby by the actuation of actuating element 5.

A first housing wall 28, which adjoins contact element insertion opening 24, is also apparent, through which an inserted contact element is guided at least in areas. First housing wall 28 completely or at least predominantly covers contact section 32 in a viewing direction into contact element insertion opening 24. Contact section 32 is thus arranged in the area of an undercut of housing 2, which has the advantage that an inserted contact element is not hindered by contact section 32 during insertion, in particular it is unable to become stuck there.

It is also apparent that second clamping spring 6 is arranged behind a second housing wall 29 with a root area of second clamping leg 62, whereby a fixing of second clamping spring 6 takes place, on the one hand, and these corresponding areas of second clamping spring 6 are also arranged so as to be concealed in an undercut area of housing 2, on the other hand, so that they also do not hinder the insertion of the contact element. The area, in which clamping leg 62 branches off from a base section 66 of second clamping spring 6, is viewed as the root area of second clamping leg 62.

Figure 2:
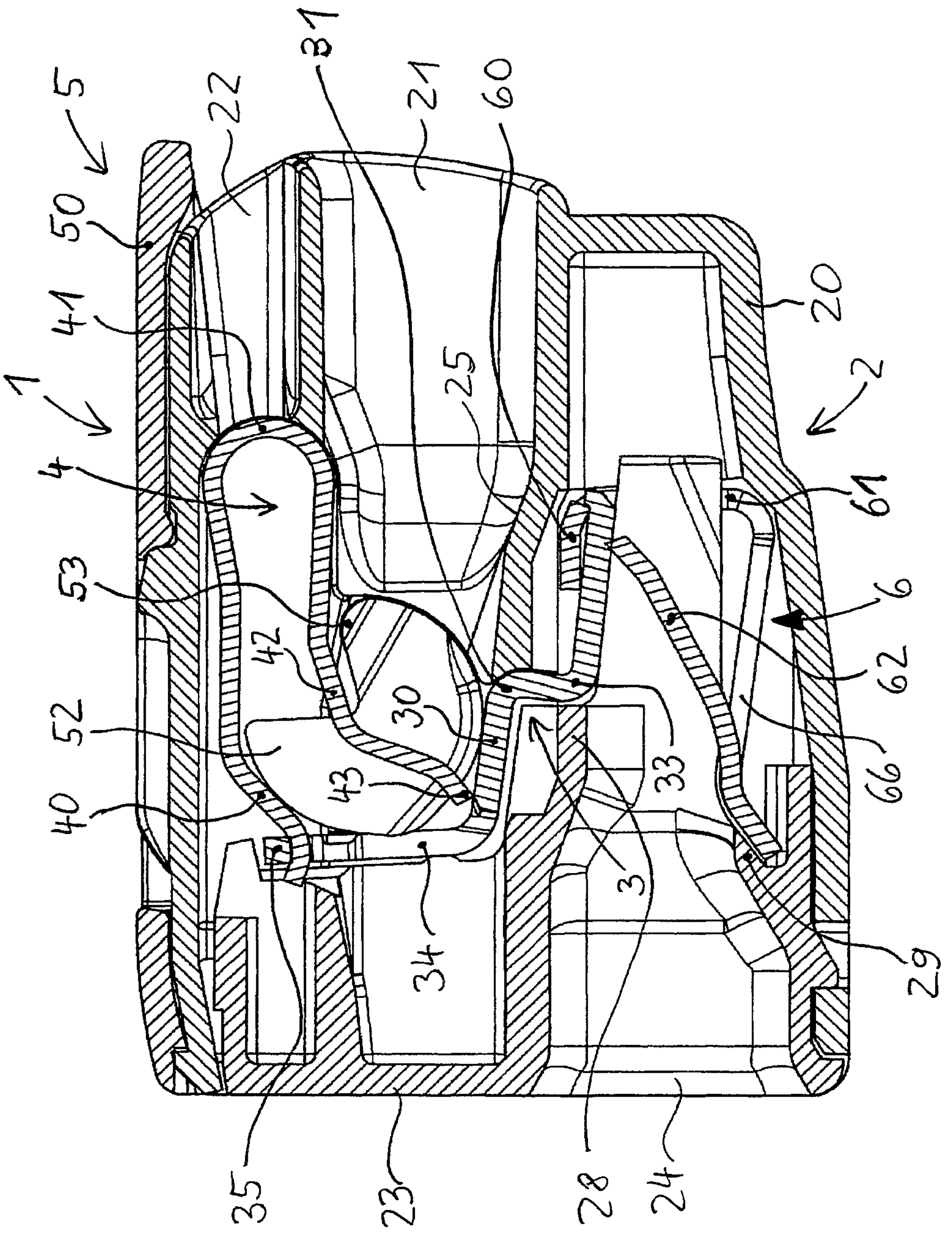
FIG. 2 shows a side sectional representation of an example embodiment of a conductor terminal.

FIG. 2 shows one specific embodiment of the conductor terminal, which is provided with the same design as the specific embodiment described on the basis of FIG. 1 with regard to housing 2 of actuating element 5 and first clamping spring 4. In contrast to the specific embodiment in FIG. 1, busbar 3 is designed with an elongated holding section 34, which has a through-opening on the end side, which is limited by a transverse web 35. In this case, the free end of first contact leg 40 is suspended in the opening of holding section 34 of busbar 3.

In the direction toward contact section 32, busbar 3 has a different design than in the specific embodiment in FIG. 1. While, in the specific embodiment in FIG. 1, the first bent section has an angle of approximately 180 degrees, in the specific embodiment in FIG. 2, not only first bent section 31 but also a second bent section 33 is present, which is bent in the opposite bending direction from first bent section 31. First and second bent sections 31, 33 each have an angle of 90 degrees. Busbar 3 is provided with a stepped design in this area.

Second clamping spring 6 does not have an elongated holding section in this case. Only a second contact leg 60 of second clamping spring 6 adjoins connecting section 61 in this case. Second contact leg 60 is arranged on the side of contact section 32 facing away from second clamping leg 62 and is fastened to busbar 3 in this location.

Figure 3:
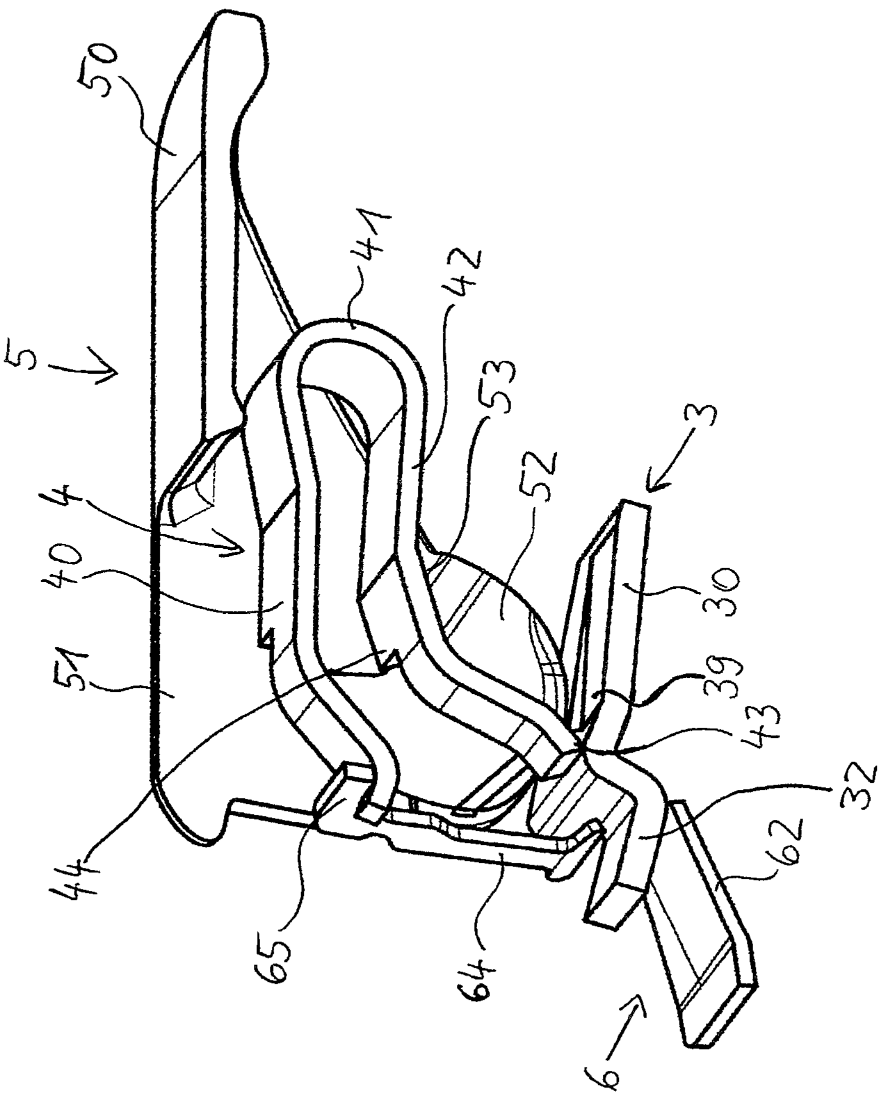
FIG. 3 shows the contact insert of a conductor terminal according to an example embodiment in a perspective representation.

FIG. 3 shows a contact insert, including an actuating element 5, which is configured for insertion into a housing, which may correspond to the specific embodiment in FIG. 1. For the sake of better clarity, however, the elements of housing 2 are not shown in FIG. 3. Actuating element 5 illustrated on the basis of FIG. 3 is also suitable for use in the conductor terminals according to FIGS. 1 and 2.

As is apparent in FIG. 3, first contact leg 40 is suspended in the recess of elongated holding section 64 of second clamping spring 6, so that it is held by transverse web 65.

It is further apparent that busbar 3 may have a contact rib 39 in the area of clamping section 30. The electrical contacting and clamping of the electrical conductor at the first clamping point may be further improved hereby.

It is further apparent that actuating element 5, which is also illustrated in FIG. 3 in a cutaway representation and, in the complete embodiment, is designed so as to be mirror-symmetrical to the part illustrated in FIG. 3, includes a side plate 51 in each case, which adjoins manual gripping area 50. Actuating element 5 overlaps parts of the contact insert with the two side plates 51, in particular first clamping spring 4, which may be arranged in this way largely in the area surrounded by actuating element 5 or its side plates 51. For example, actuating element 5 may be supported loosely (in a floating manner) on other parts of the conductor terminal, e.g., on busbar 3, via its side plates 51.

It is further apparent that actuator 52 protrudes from particular side plate 51 on the side of the area surrounded by side plates 51 and thus projects toward first clamping spring 4. Actuator 52 this protrudes in the direction of the conductor receiving area or in the direction of the terminal interior. First clamping spring 4 may be formed in the area of first clamping leg 42 in such a way that the material of first clamping spring 4 is reduced to a smaller width in the area of actuating contour 53, so that first clamping leg 42 is narrower in its end-side area, in particular in the area of clamping edge 43, than in other areas, where it may have the width of first spring bend 41. A side actuating section 44 of clamping leg 42 is created hereby, on which actuating contour 53 may engage and deflect clamping leg 42 upon a pivoting of actuating element 5. An electrical conductor guided to first clamping point is guided between actuators 52.

Figure 4:
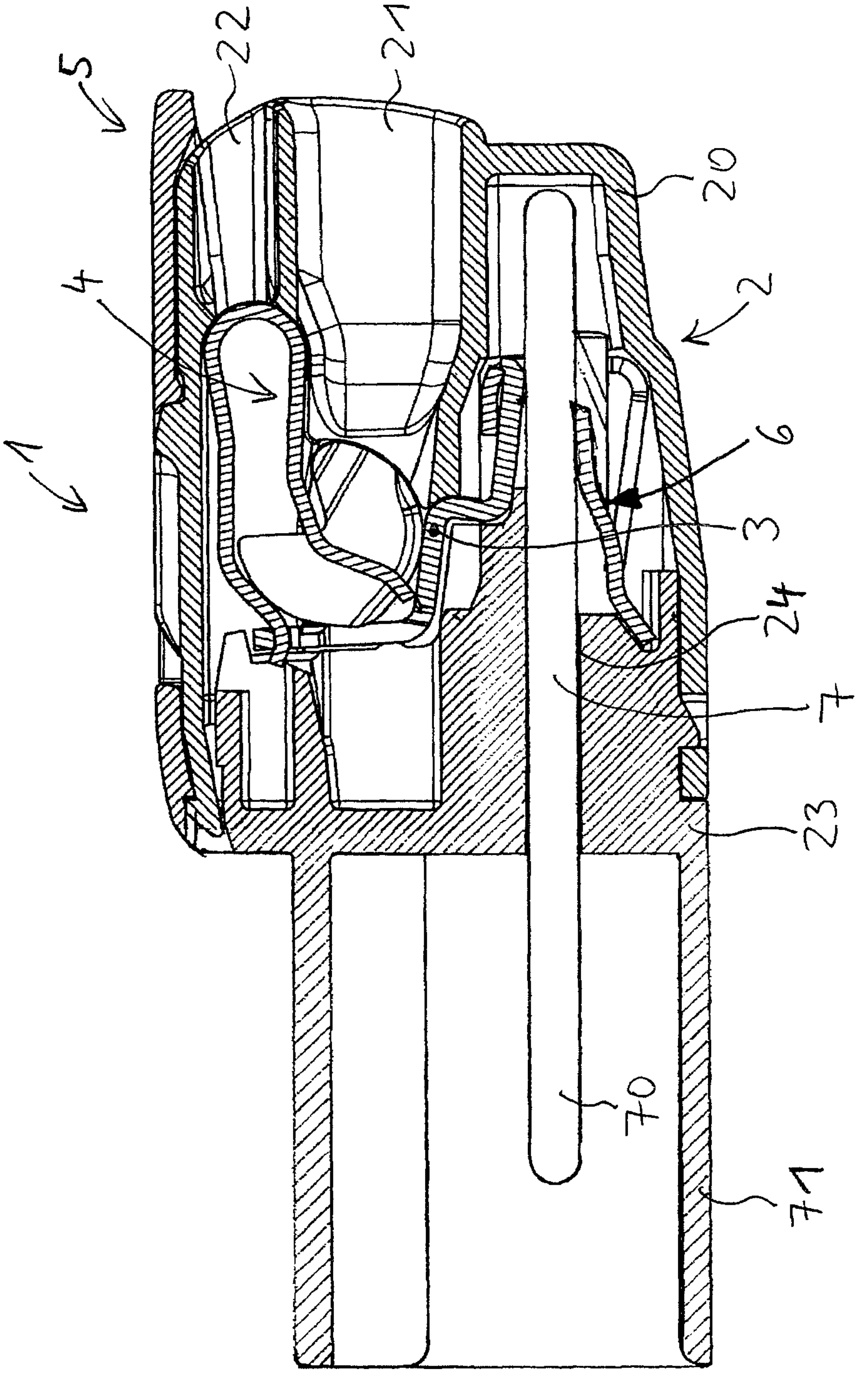
FIG. 4 shows a conductor terminal 1 in the form of a plug connector in a side sectional representation.

FIG. 4 shows a first specific embodiment of a conductor terminal 1, in which the conductor terminal is expanded into a plug connector by modifying cover part 23 of housing 2. Conductor terminal 1 may first be implemented with the aid of the features explained on the basis of FIGS. 1 through 3, FIG. 4 being oriented toward the specific embodiment in FIG. 2 by way of example. In contrast to FIG. 2, cover part 23 is now designed with a plug-in housing section 71 formed thereon. An electrical plug contact is situated in plug-in housing section 71, for example in the form of a blade contact 70. The plug contact is electrically connected to a contact element 7 or is formed therewith in a structural unit, e.g., as a metal part. Contact element 7 is clamped at the second clamping point, i.e. between second clamping leg 62 of second clamping spring 6 and contact section 32 of busbar 3. Contact element 7 extends through contact element insertion opening 24 of housing 2, which is adapted in this case with respect to its shaping in such a way that contact element 7 is held therein in a form-fitting and/or force-fitting manner. Conductor terminal 1 expanded into a plug connector in this way may be mounted together with plug-in housing section 71 and plug contact 70 onto a plug connector designed as a mating piece for the purpose of forming an electrical plug connection in this manner.

Figure 5:
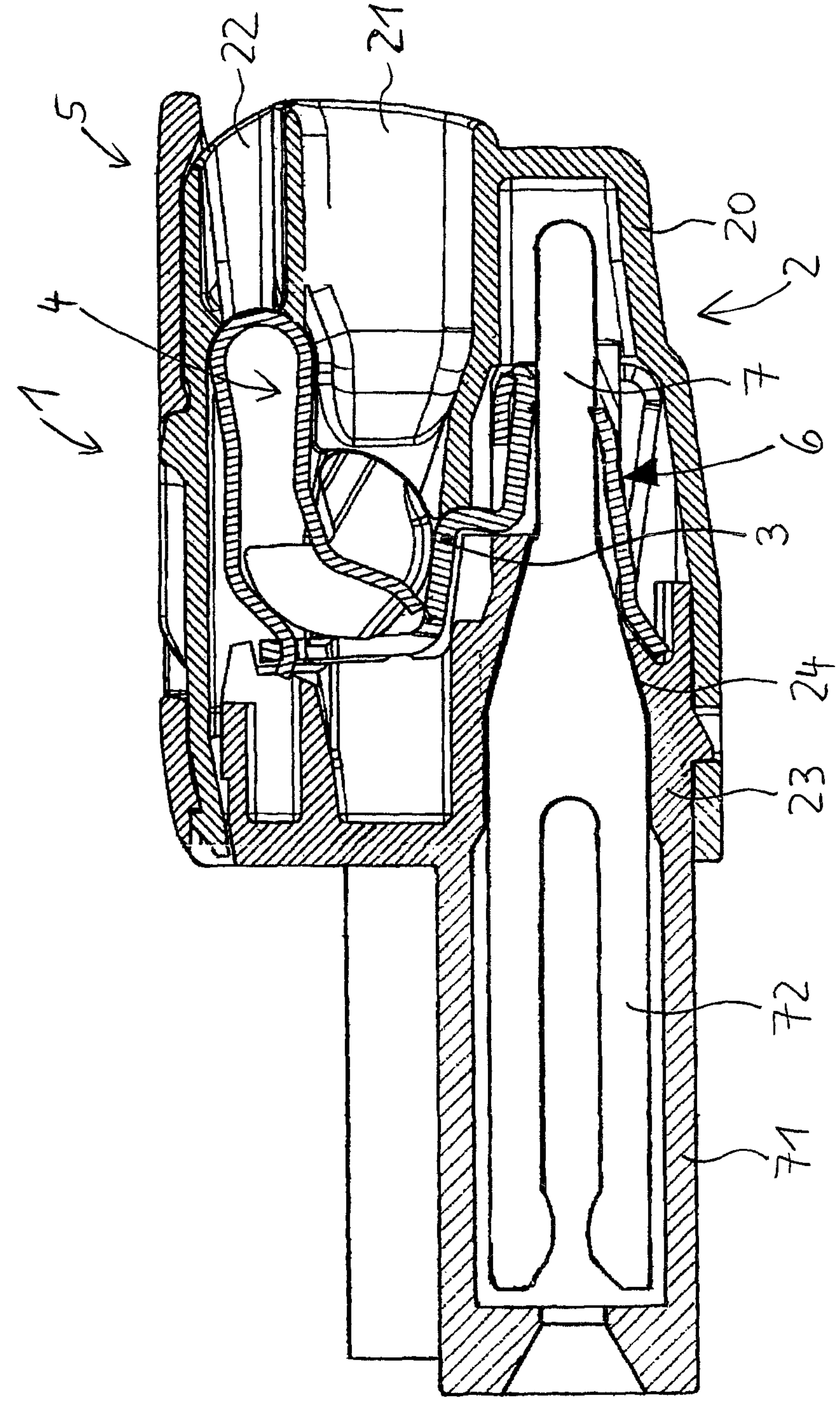
FIG. 5 shows an example embodiment of a conductor terminal in the form of a plug connector in a side sectional representation.

FIG. 5 shows a further specific embodiment of an expansion of conductor terminal 1 into a plug connector by correspondingly modifying cover part 23. In the specific embodiment in FIG. 5, the plug contact is designed as a bifurcated contact 72. The plug contact is again electrically connected to a contact element 7 or is formed therewith in a structural unit, e.g., as a metal part. Contact element 7 is again clamped at the second clamping point, i.e. between second clamping leg 62 and contact section 32. Plug contact 72 is arranged in plug-in housing section 71, which in this case is adapted to the different shaping of plug contact 72 as a bifurcated contact.

In this way, conductor terminal 1 may be used in an even more variable manner, either as a snap-on terminal for mounting on a contact element of an electrical device or as an electrical plug connector, which may also be mounted either on an electrical device or on another mating plug connector.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A conductor terminal comprising:

a housing that has a conductor insertion opening for inserting an electrical conductor and a contact element insertion opening for inserting a contact element;

a busbar that has a clamping section arranged between the inserted electrical conductor and the inserted contact element;

a first clamping spring to clamp the electrical conductor, the first clamping spring includes a first clamping leg having a clamping edge oriented in a direction of the clamping section, a first spring bend, and a first contact leg, the clamping edge and the clamping section forming a first clamping point for clamping the electrical conductor; and a second clamping spring that is a separate component from the first clamping spring, the second clamping spring including at least one second clamping leg to clamp the contact element, the second clamping leg being oriented in the direction of a contact section of the busbar so that a second clamping point for the contact element to be clamped is formed between the contact section and the second clamping leg.

2. The conductor terminal according to claim 1, wherein the busbar has a first bent section adjoining the clamping section, in which the busbar transitions in an arch-shaped manner directly into the contact section or via at least one further section of the busbar.

3. The conductor terminal according to claim 1, wherein the contact section is arranged essentially and/or predominantly in parallel to the clamping section.

4. The conductor terminal according to claim 1, wherein the first clamping spring is suspended by its first contact leg on an elongated holding section of the second clamping spring or on an elongated holding section of the busbar.

5. The conductor terminal according to claim 4, wherein the holding section runs orthogonally or predominantly orthogonally to the clamping section.

6. The conductor terminal according to claim 1, wherein the second clamping spring and the busbar are coupled with each other in a form-fitting manner.

7. The conductor terminal according to claim 1, wherein the second clamping spring includes a second contact leg, and wherein the second clamping leg and the busbar are coupled with each other in a form-fitting manner.

8. The conductor terminal according to claim 1, wherein the conductor terminal is a snap-on terminal and/or a luminaire terminal, which may be mounted with the contact element insertion opening on a contact element of an electrical device.

9. The conductor terminal according to claim 1, wherein the housing includes at least one main housing part and a cover part and a contact insert arranged in the housing, which includes at least the busbar, and wherein the cover part is fixed in the housing in interaction with the main housing part via the first clamping spring and the second clamping spring.

10. The conductor terminal according to claim 1, wherein the housing has a fixing area, which is configured to fasten a function element to the housing or to fasten the housing to a function element of this type.

11. The conductor terminal according to claim 1, wherein a contact element insertion channel adjoins the contact element insertion opening, which is at least partially formed by housing walls of the housing, the entire or a portion of the contact section and/or a portion of the second clamping spring being arranged behind a recessed area of the housing covered by the housing wall in the longitudinal direction of the contact element insertion channel, viewed from the contact element insertion opening.

12. The conductor terminal according to claim 1, wherein the first clamping leg and the second clamping leg are arranged on opposite sides of the busbar.

13. The conductor terminal according to claim 1, wherein the first clamping leg points in the direction of the busbar from a side, and the second clamping leg points in the direction of the busbar from another side, and wherein the first clamping leg and the second clamping leg extend toward each other.

14. The conductor terminal according to claim 1, wherein the first clamping leg and the second clamping leg are arranged on opposite sides of the busbar.

15. The conductor terminal according to claim 1, wherein the housing includes at least one main housing part and a cover part, and wherein the busbar extends through an opening, at which the main housing part and the cover part do not adjoin each other.

* * * * *